US012086464B2

(12) United States Patent
Hensler (10) Patent No.: US 12,086,464 B2
(45) Date of Patent: Sep. 10, 2024

(54) STORAGE POLICY CHANGE USAGE ESTIMATION

(71) Applicant: Microsoft Technology Licensing, LLC, Redmond, WA (US)

(72) Inventor: Kenyon James Hensler, Acworth, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 131 days.

(21) Appl. No.: 17/850,607

(22) Filed: Jun. 27, 2022

(65) Prior Publication Data

US 2023/0418520 A1   Dec. 28, 2023

(51) Int. Cl.
  G06F 3/06 (2006.01)
(52) U.S. Cl.
  CPC .......... G06F 3/0659 (2013.01); G06F 3/0619 (2013.01); G06F 3/0664 (2013.01); G06F 3/067 (2013.01); G06F 3/0689 (2013.01)
(58) Field of Classification Search
  None
  See application file for complete search history.

(56) References Cited

U.S. PATENT DOCUMENTS

| 5,960,451 | A  | * | 9/1999 | Voigt ..................... G06F 11/324 |
| | | | | 360/902 |
| 6,275,898 | B1 | * | 8/2001 | DeKoning ............ G06F 3/0605 |
| | | | | 711/114 |
| 8,793,373 | B2 |   | 7/2014 | Nakama |
| 8,806,487 | B2 |   | 8/2014 | Zhang et al. |
| 10,019,163 | B2 |   | 7/2018 | Rivera et al. |
| 10,592,384 | B2 |   | 3/2020 | Pannem et al. |
| 11,593,189 | B1 | * | 2/2023 | Morley ................. G06F 11/008 |
| 2004/0172503 | A1 | * | 9/2004 | Merchant ............ G06F 11/1096 |
| | | | | 714/E11.034 |
| 2010/0281213 | A1 | * | 11/2010 | Smith ..................... G06F 3/061 |
| | | | | 711/E12.001 |
| 2014/0281350 | A1 |   | 9/2014 | Lango et al. |
| 2014/0282824 | A1 | * | 9/2014 | Lango ..................... H04L 47/83 |
| | | | | 726/1 |

(Continued)

OTHER PUBLICATIONS

Standard RAID levels (Wikipedia: edited Nov. 10, 2021) pp. 12 (Year: 2021).*

(Continued)

*Primary Examiner* — Kaushikkumar M Patel (57) ABSTRACT

Aspects of the present disclosure relate to storage policy change usage estimation. In examples, a base storage utilization is generated for a storage object according to a current storage policy. The current storage policy may comprise a RAID ("redundant array of independent disks") level and/or a fault tolerance level with which the storage object is stored. An estimated storage utilization may then be generated for the storage object based on the base storage utilization and a new storage policy accordingly. Thus, the base storage utilization may omit or otherwise account for overhead associated with the RAID level and/or fault tolerance level indicated by the current storage policy, while the resulting estimated storage utilization may indicate an estimated physical storage utilization for the storage object if the new storage policy is implemented in place of the current storage policy.

20 Claims, 8 Drawing Sheets

(56) References Cited

U.S. PATENT DOCUMENTS

| | | |
|---|---|---|
| 2014/0289426 A1 | 9/2014 | Chan et al. |
| 2016/0132258 A1* | 5/2016 | Joshi ............... G06F 3/0689 |
| | | 711/114 |
| 2017/0220287 A1 | 8/2017 | Wei |
| 2020/0007405 A1 | 1/2020 | Chitalia et al. |
| 2020/0210090 A1* | 7/2020 | Darisa ............... G06F 3/0614 |
| 2020/0349004 A1* | 11/2020 | Ma ............... G06F 3/0644 |
| 2021/0011830 A1 | 1/2021 | Khokhar et al. |
| 2021/0034403 A1 | 2/2021 | Yun et al. |
| 2021/0157312 A1 | 5/2021 | Cella et al. |
| 2022/0179555 A1 | 6/2022 | Hogan et al. |

OTHER PUBLICATIONS

"Planning Capacity in vSAN", Retrieved from: https://docs.vmware.com/en/VMware-vSphere/7.0/com.vmware.vsphere.vsan-planning.doc/GUID-581D2D5C-A88F-4318-A8B3-5A5F343F1247.html, Aug. 27, 2021, 85 Pages.

Bryant, Paul, "VxRail / vSAN Capacity Math Made Easy", Retrieved from: https://digitalthoughtdisruption.com/2019/03/26/vsan-capacity-math-made-easy/, Mar. 26, 2019, 6 Pages.

Vreede, Tond. , "Get Datastore Files", Retrieved from: https://www.controlup.com/script-library-posts/get-datastore-files/?msclkid=bd939172b0f311ecbe7e9554c749c8d8, Jan. 16, 2019, 7 Pages.

"International Search Report and Written Opinion Issued in PCT Application No. PCT/US23/023290", Mailed Date: Sep. 4, 2023, 11 Pages.

* cited by examiner

STORAGE POLICY CHANGE USAGE ESTIMATION

BACKGROUND

Changes to a storage policy may affect an amount of physical or actual storage that is associated with a storage object. Accordingly, it may be beneficial to estimate the effect of a storage policy change prior to implementation, thereby avoiding or reducing the likelihood of computing resource availability issues, unexpected downtime, or failed policy changes (resulting in potentially wasted computing resources), among other detriments.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to storage policy change usage estimation. In examples, a base storage utilization is generated for a storage object according to a current storage policy. The current storage policy may comprise a RAID ("redundant array of independent disks") level and/or a fault tolerance level with which the storage object is stored. An estimated storage utilization may then be generated for the storage object based on the base storage utilization and a new storage policy accordingly. Thus, the base storage utilization may omit or otherwise account for overhead associated with the RAID level and/or fault tolerance level indicated by the current storage policy, while the resulting estimated storage utilization may indicate an estimated physical storage utilization for the storage object if the new storage policy is implemented in place of the current storage policy.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents. Further, as used herein, "and/or" is intended to be interpreted identically to a Markush grouping. For example, "A, B, and/or C" will be understood to mean "at least one item selected from the group consisting of A, B, and C."

In examples, one or more storage objects are stored by a datastore. Examples of a storage object includes, but is not limited to, a virtual disk, a storage volume (e.g., a layer above a storage device, as may be associated with one or more partitions, RAID abstraction structures, and/or fault tolerance), a storage space (e.g., a grouping of storage having an associated level of fault tolerance, caching, and/or other properties), a file system, a (recursive) subdirectory or set of files, a single file, and/or a binary large object (a "blob"). For instance, a virtual environment (e.g., a virtual machine or a container) may be associated with one or more datasets or virtual disks that are stored by the datastore. Each storage object may have an associated storage policy or, as another example, a storage object may inherit a storage policy (e.g., from a virtual environment or from another storage object), among other examples.

A storage policy may indicate a RAID ("redundant array of independent disks") level and/or a fault tolerance level (or "FTT") with which the storage object is stored. For example, the storage object may be stored at a specified RAID level (e.g., RAID1, RAID5, or RAID6) and an associated fault tolerance level (e.g., indicating a number of storage device failures that can be tolerated before data loss may occur, such as a fault tolerance level of "1" or "2" storage devices). As a result, storage overhead may be incurred as a result of parity data that is written to satisfy a specified fault tolerance level, such that the base storage utilization of the storage object differs from the actual or physical storage utilization. As an example, RAID1 with FTT=1 may incur a storage overhead of 100% (e.g., the actual storage utilization may be twice that of the base storage utilization), due to the mirrored nature of RAID1. As another example, RAID6 with FTT=2 may incur a storage overhead of 50% (e.g., where the actual storage utilization is 1.5× that of the base storage utilization). As used herein, storage overhead and storage efficiency may have an inverse relationship (e.g., a storage overhead of 2× or 1.5× may have an associated storage efficiency of 50% or approximately 66%, respectively).

Thus, when the storage policy associated with the storage object is changed, the base storage utilization may remain substantially unchanged, while the physical utilization may be change as a result of changes to the RAID level and/or fault tolerance level indicated by the new storage policy. However, changing a storage policy may result in unintended consequences, such as increased computing resource consumption (e.g., storage, bandwidth, and/or compute resources), increased or unexpected expense (e.g., as may be the case in a cloud environment, where expenses are based on resource utilization), and/or availability issues (e.g., unexpected downtime, as well as decreased or diminished free space).

Accordingly, aspects of the present disclosure relate to storage policy change usage estimation, where a base storage utilization is generated for a storage object according to a current storage policy. An estimated storage utilization may then be generated for the storage object based on a new storage policy accordingly. In examples, an estimated storage utilization is generated for each storage object of a set of storage objects (e.g., as may be associated with a virtual environment), such that an aggregated estimate may be determined for the set of storage objects. As an example, an aggregated estimate may be generated for one or more virtual environments based on the set of storage objects associated therewith. It will be appreciated that, when generating such an aggregate estimate, each storage object need not use the same current storage policy and/or the same new storage policy.

The base storage utilization of a storage object may be determined based on a current storage policy for the storage object, wherein the current storage policy comprises an indication of a RAID level and/or fault tolerance level. As an example, the current storage policy may indicate a RAID level of "5" and that the storage object is stored with a parity level of "1", such that, for a data store having four storage devices, it may be determined that the storage object is stored with a data efficiency of 75% (e.g., four total stripes, with one for parity). Thus, the base storage utilization of the storage object may be determined to be 75% of its associated actual storage utilization (e.g., as may be indicated by the physical storage associated with the storage object). For instance, if the actual storage utilization storage object is 2 GB in the instant example, it may be determined that the base storage utilization for the storage object is 1.5 GB (e.g., 75% of 2 GB). It will be appreciated that the disclosed storage policies, ratios, and associated processing are provided for illustrative purposes and, in other examples, any of a variety of other RAID levels and/or fault tolerance levels may be used.

Using the base storage utilization of a storage object, an estimated storage utilization may be determined for a new storage policy. Similar to the above-discussed current storage policy, the new storage policy may also indicate a RAID level and/or fault tolerance level, one or both of which may differ from the current storage policy for the storage object. For example, the new storage policy may indicate a RAID level of "1" with a fault tolerance level of "3". Thus, the storage efficiency of the new storage policy may be determined to be 25% (e.g., mirrored storage devices, each storing the same data). The estimated storage utilization may be generated based on the determined storage efficiency and the base storage utilization, thus estimating the actual or physical storage utilization associated with the storage object according to the new storage policy. Returning to the above example, a base storage utilization of 1.5 GB may be processed according to the determined storage efficiency (e.g., 25%) to determine that the estimated storage utilization will be 6.0 GB (e.g., storing 1.5 GB at an efficiency of 25%).

It will be appreciated that base storage utilization may differ from a capacity and/or an available storage of a given storage object. For example, a virtual disk may have a capacity of 100 GB (e.g., appearing to have a capacity of 100 GB to an associated virtual environment). However, if the virtual disk has only 5 GB of valid content, the base storage utilization of the virtual disk may be determined to be 5 GB rather than 100 GB. Further, the base storage utilization of a storage object may be determined in any of a variety of ways, such as by tracking one or more portions of the storage object that contain valid data. As an example, a virtual disk may contain a bitmap or other data structure that tracks "in-use" sectors (e.g., those that store valid or user data) and may mark sectors that no longer store such data accordingly (e.g., in response to a TRIM request). As another example, a sparse file in a file system may similarly track which portions contain non-default (e.g., non-zero) data. Thus, valid, non-default, and/or user data includes data that would be returned from the storage object if a read is attempted from the storage object.

Additionally, it will be appreciated that any of a variety of techniques may be used to process an actual storage utilization to generate a base storage utilization or a base storage utilization to generate an estimated storage utilization. For example, a mapping may exist between a RAID level of "5" and a fault tolerance level of "1", and a storage efficiency of 75% (e.g., a divisor of 1.33). Similarly, a mapping may exist between a RAID level of "6" and a fault tolerance level of "2", and a storage efficiency of 66.67% (e.g., a divisor of 1.5). As a further example, a mapping may exist between a RAID level of "1" and a default fault tolerance level of "1", thus having a storage efficiency of 50% (e.g., a divisor of 2.0). It will be appreciated that such mappings are provided as examples and, in other examples, any of a variety of mappings between storage policies and associated storage efficiencies.

As a further example, a set of rules may be used, an example of which is provided by the pseudocode below, in which $disk.Raid represents a RAID level of a current storage policy, $disk.FTT represents a fault tolerance level of the current storage policy, $destRaid represents a RAID level of a new storage policy, and $destFTT represents a fault tolerance level of the new storage policy:

```
if (($disk.Raid -eq "RAID-1 (Mirroring) - Performance") ) {
    $diskBase = $disk.FileSizeKB / ($disk.FTT+1)
}
if (($disk.Raid -eq "RAID-5/6 (Erasure Coding) - Capacity") -and
($disk.FTT -eq 1) ) {
    $diskBase = $disk.FileSizeKB / (4/3)
}
if (($disk.Raid -eq "RAID-5/6 (Erasure Coding) - Capacity") -and
($disk.FTT -eq 2) ) {
    $diskBase = $disk.FileSizeKB / (3/2)
}
$diskReslt = 0
if ($destRaid -eq "RAID-1 (Mirroring) - Performance") {
    $diskResult = $diskBase * ($destFTT + 1)
}
elseif (($destRaid -eq "RAID-5 (Erasure Coding) - Capacity") -and
($destFTT -eq 1) ) {
    $diskResult = $diskBase * (4/3)
}
elseif (($destRaid -eq "RAID-5/6 (Erasure Coding) - Capacity") -
and ($destFTT -eq 2) ) {
    $diskResult = $diskBase * (3/2)
}
```

Any of a variety of indications may be provided and/or other operations may be performed as a result of the storage utilization estimation aspects described herein. For example, an indication may be presented to a user that comprises an estimated difference in physical storage utilization between a current storage policy and a new storage policy for a given storage object. In examples, the change indication may be for a set of storage objects (e.g., as may be associated with a virtual environment). As an example, given a disk utilization of 1.5 GB using a current storage policy of RAID6 and FTT=2, and a destination policy of RAID1 with FTT=2, the change indication may indicate that the storage utilization for the storage object will increase by 1.5 GB (e.g., the difference between the current actual storage utilization of 1.5 GB on a base utilization of 1.0 GB, and the estimated storage utilization of 3.0 GB).

As another example, given a disk utilization of 4 GB using a current storage policy of RAID5 and FTT=1, and a destination or new policy of RAID1 and FTT=1, the change indication may indicate that the storage utilization of the storage object will increase by 2 GB (e.g., the difference between the current actual storage utilization of 4 GB on a base utilization of 3 GB, and the estimated storage utilization of 6 GB). As a further example, given a disk utilization of 6 GB using a current storage policy of RAID1 and FTT=1, and a new policy of RAID6 and FTT=2, the change indication may indicate that the storage utilization of the storage object will decrease by 1.5 GB (e.g., the difference between the current actual storage utilization of 6 GB on a base utilization of 3 GB, and the estimated storage utilization of 4.5 GB).

The increase may be presented as a percentage difference (e.g., a 100% increase in the first example, a 50% increase in the second example, or a 25% decrease in the third example) and/or may be presented visually. For example, a user interface may be generated in which a pie graph, bar graph, or other user interface element is used to graphically represent an estimated change in storage associated with the changed storage policy. In instances where an aggregate estimate is generated for a set of storage objects, the aggregate estimate may be presented in addition to or as an alternative to one or more estimated storage utilizations for constituent storage objects. User input may then be received to accept, modify, or reject the new storage policy. In instances where user input is received to modify the storage policy, a new estimate may be generated and presented to the user. It will thus be appreciated that any of a variety of techniques may be used to present such determinations to a user of the computing device.

As another example, aspects of the present disclosure may be used to automatically configure and/or change storage policies of a datastore. For example, an application programming interface (API) may be provided with which an estimated storage utilization may be obtained for a set of storage objects. As an example, an API call may specify each storage object of the set of storage objects and/or may specify an entity with which the set of storage objects are associated (e.g., a virtual environment). A determination may then be made based on the obtained storage utilization estimate, for example whether to migrate a virtual environment to a different host computing device and/or whether to change one or more associated storage policies (e.g., to reduce an actual storage utilization or to improve fault tolerance), among other examples.

Thus, aspects of the present disclosure provide technical improvements for computing operations associated with storage objects of a datastore. For example, virtual environment management and/or migration may be improved as a result of the storage policy change usage estimation described herein. As noted above, aspects of the present disclosure may enable automatic management or improved automatic management of storage objects. Additionally, an associated user experience may be improved as a result of greater visibility into the effect of changes to user-configurable aspects of the computing environment. It will be appreciated that any of a variety of additional or alternative technical improvements may be enabled as a result of the disclosed aspects.

Figure 1:
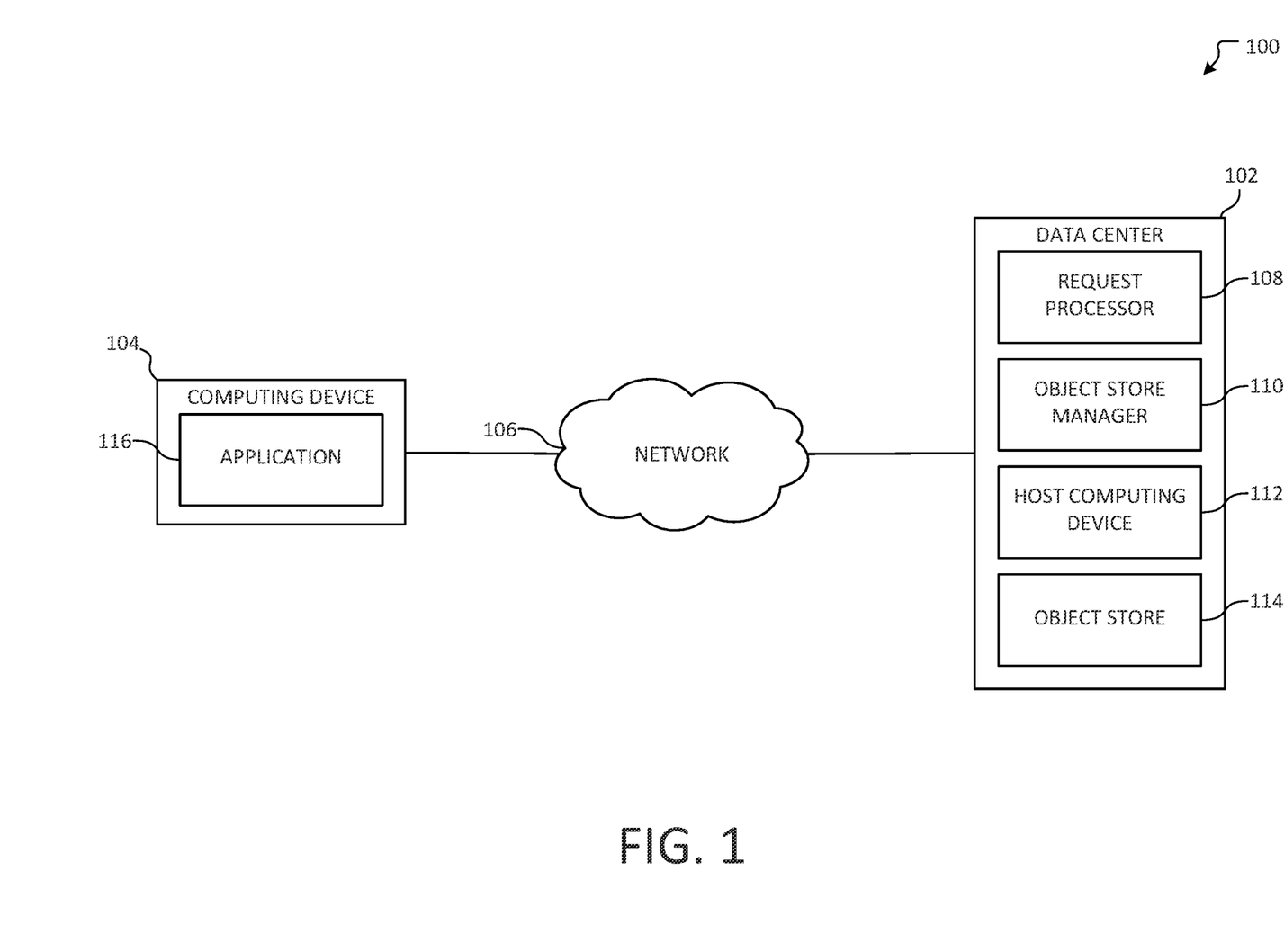
FIG. 1 illustrates an overview of an example system for storage policy change usage estimation according to aspects described herein.

FIG. 1 illustrates an overview of an example system 100 for storage policy change usage estimation according to aspects described herein. As illustrated, system 100 includes data center 102, computing device 104, and network 106. In examples, data center 102 and computing device 104 may communicate via network 106, which may comprise a local area network, a wireless network, or the Internet, or any combination thereof, among other examples.

Data center 102 is illustrated as comprising request processor 108, object store manager 110, host computing device 112, and object store 114. System 100 is provided as an example in which data center 102 manages execution of one or more virtual environments, though it will be appreciated that the disclosed aspects may be used for storage policy change estimation in any of a variety of alternative contexts. Request processor 108 may process requests received from computing device 104, for example to manage operation of data center 102 according to aspects described herein. As another example, computing device 104 may be a client computing device, such that request processor 108 may direct requests from computing device 104 to a virtual environment executing on host computing device 112, among other examples.

Object store 114 may be a datastore comprising one or more storage objects of data center 102. For example, object store 114 may store a set of storage objects (e.g., datasets or virtual disks) associated with a virtual environment executing on host computing device 112, such that host computing device 112 may issue read and/or write operations to object store 114 accordingly. It will be appreciated that any of a variety of additional or alternative storage objects may be stored by object store 114. Similarly, any of a variety of other processing may be performed using storage objects of object store 114 in other examples.

Object store 114 may be managed by object store manager 110, such that object store 114 stores storage objects according to an associated storage policy. In examples, object store manager 110 may change a storage policy associated with an object stored by object store 114, which may cause an associated change in the actual storage utilization of the storage object within object store 114. In some instances, object store manager 110 may generate an estimated storage utilization based on a new or changed storage policy according to aspects of the present disclosure, which may be used to automatically affect operation of data center 102 and/or may be provided for presentation to a user (e.g., of computing device 104), thereby enabling the user to accept, modify, or reject the changed storage policy accordingly.

Computing device 104 is illustrated as comprising application 116, which may communicate with data center 102. As noted above, application 116 may generate a request for data associated with a virtual environment executing on host computing device 112. In another example, application 116 may be used to configure aspects of data center 102. For example application 116 may be a native application, an Internet-based application, or any combination thereof.

Application 116 may communicate with request processor 108 to obtain an indication of a storage policy associated with one or more storage objects of object store 114. In examples, application 116 provides an indication of a virtual environment, which may be used by request processor 108 to identify the set of objects for which the storage policies are provided. Such aspects may be performed using a website associated with data center 102 or via an API, among other examples.

In some instances, an indication of a new storage policy is received by request processor 108 from application 116. As an example, the indication may comprise the selection of a different storage policy recommended by object store manager 110 or may comprise an indication of a user-configured policy that was created using application 116. The new storage policy may have been created based on changes to a current storage policy (e.g., as may have been obtained from request processor 108). Accordingly, object store manager 110 may generate an estimated storage utilization for the set of storage objects as described herein. It will be appreciated that, in other examples, at least a part of such processing may be performed local to computing device 104 (e.g., by application 116).

An indication of the estimated storage utilization may be presented by application 116, thereby enabling the user of computing device 104 to determine whether to implement the new storage policy, whether to make additional changes, or whether to use a different storage policy, among other examples. In examples, user input is received to confirm that the new storage policy is to be implemented, such that application 116 may provide an indication to object store manager 110 to implement the new storage policy accordingly. As a result, object store manager 110 may reconfigure one or more storage objects within object store 114 according to the new storage policy.

While system 100 is illustrated as comprising a single data center 102 and a single computing device 104, it will be appreciated that, in other examples, any number of such elements may be used. As an example, object store manager 110 may migrate a storage object from object store 114 to another object store (e.g., of data center 102 or of another data center, not pictured) that conforms to the new storage policy. Execution of a virtual environment associated with the storage object may similarly be migrated in some examples.

Figure 2:
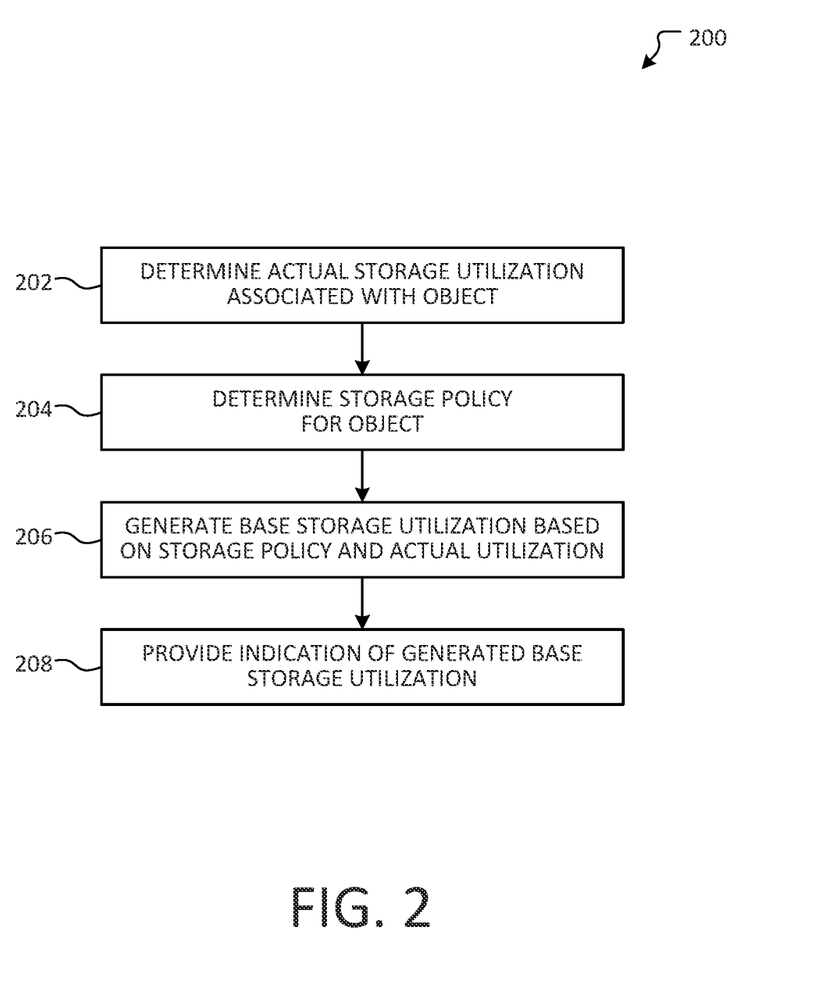
FIG. 2 illustrates an overview of an example method for generating a base storage utilization for an object based on a current storage policy according to aspects described herein.

FIG. 2 illustrates an overview of an example method 200 for generating a base storage utilization for an object based on a current storage policy according to aspects described herein. In examples, aspects of method 200 may be performed by an object store manager, such as object store manager 110 discussed above with respect to FIG. 1.

Method 200 begins at operation 202, where an actual storage utilization associated with a storage object is determined. In examples, operation 202 comprises querying a datastore (e.g., object store 114) to determine an actual amount of storage occupied by the storage object. As another example, operation 202 may comprise generating an API call to obtain the actual storage utilization of the storage object. As noted above, the actual storage utilization may be an amount of physical storage space that is used to store the storage object. It will thus be appreciated that any of a variety of techniques may be used to determine an actual storage utilization associated with a storage object according to aspects described herein.

Flow progresses to operation 204, where a storage policy is determined for the storage object. In examples, the storage policy is determined based on an association between the storage object and the storage policy or, as another example, the storage object may inherit a storage policy from another entity (e.g., a virtual environment or another storage object). In some examples, the storage policy may be obtained using an API call associated with the object store. As noted above, the storage policy may comprise an indication of a RAID level and/or a fault tolerance level for the storage object.

Method 200 continues to operation 206, where a base storage utilization is generated based on the storage policy (e.g., as was determined at operation 204) and the actual utilization (e.g., as was determined at operation 202. The base storage utilization may be generated using one or more mappings, a set of rules, or any of a variety of other techniques according to aspects described herein. As compared to the actual utilization (e.g., which may be indicative of the raw data associated with the storage object), the base storage utilization may be the amount of data that that is used by the storage object in the absence of RAID and/or parity. In the context of a virtual disk, the base storage may be an amount of data stored by the virtual disk as determined by an associated virtual environment (in an instance where the storage object is a sparse disk) or may be the amount of data for which the virtual disk was allocated (in an instance where the storage object is not sparse, e.g., the amount of both used and unused space). Thus, operation 206 may comprise evaluating an amount of redundant data and/or parity data associated with a given RAID level and/or fault tolerance level specified by the current storage policy.

Moving to operation 208, an indication of the generated base storage utilization is provided. For example, if method 200 is performed in response to receiving an API call to determine a base storage utilization of a storage object, the determined base storage utilization may be provided in response to the API call. As another example, the generated storage utilization may be provided for display to a user (e.g., by an application, such as application 116 in FIG. 1). As another example, the base storage utilization may be used to perform additional processing, an example of which is discussed below with respect to method 300 of FIG. 3. Method 200 terminates at operation 208.

Figure 3:
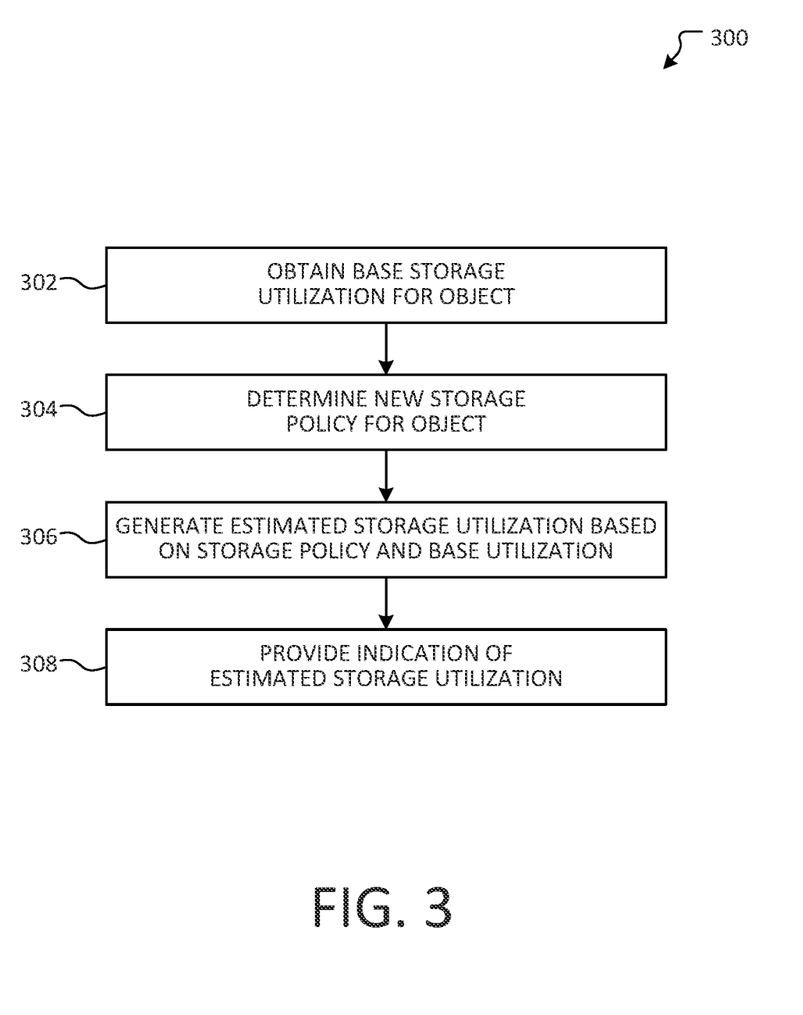
FIG. 3 illustrates an overview of an example method for generating an estimated storage utilization for an object based on a base storage utilization and a new storage policy for the object according to aspects described herein.

FIG. 3 illustrates an overview of an example method 300 for generating an estimated storage utilization for an object based on a base storage utilization and a new storage policy for the object according to aspects described herein. In examples, aspects of method 300 may be performed by an object store manager, such as object store manager 110 discussed above with respect to FIG. 1.

Method 300 begins at operation 302, where a base storage utilization is obtained for a given storage object. For example, operation 302 may comprise performing aspects of method 200 discussed above with respect to FIG. 2. As another example, operation 302 may comprise generating an API call to obtain the base storage utilization accordingly.

Flow progresses to operation 304, where a new storage policy is determined for the storage object. In examples, the new storage policy may be determined based on an indication that was received from a computing device (e.g., computing device 104 in FIG. 1). For example, the indication may be received from an application (e.g., application 116) and/or via a website associated with a data center (e.g., data center 102). As another example, the new storage policy may be automatically determined (e.g., based on one or more hardware characteristics and/or an amount of available space of an object store). It will thus be appreciated that any of a variety of techniques may be used to determine the new storage policy. The indication may indicate a changed RAID level and/or a fault tolerance level for the storage object.

Accordingly, at operation 306, an estimated storage utilization is generated for the storage object based on the base storage utilization (e.g., as was determined at operation 302) and the new storage policy (e.g., as was determined at operation 304). For example, if a RAID level of "1" is used (e.g., such that the data is mirrored) with a fault tolerance level of "2" (e.g., such that two of three storage devices could exhibit a failure), the estimated storage utilization may be determined by tripling the base storage utilization that was obtained at operation 302, as the storage object would occupy three times the base storage (e.g., comprising one copy for each storage device of the object store). Thus, operation 306 may comprise evaluating an amount of redundant data and/or parity data associated with a given RAID level and/or fault tolerance level specified by the new storage policy.

Moving to operation 308, an indication of the generated estimated storage utilization is provided. For example, if method 300 is performed in response to receiving an API call to determine an estimated storage utilization of a storage object, the determined estimated storage utilization may be provided in response to the API call. As another example, the estimated storage utilization may be provided for display to a user (e.g., by an application, such as application 116 in FIG. 1). In some instances, the display may comprise a difference between a current storage utilization and the estimated storage utilization. As another example, the estimated storage utilization may be used to perform additional processing, as may be the case when the new storage policy is applied in response to receiving an indication to apply the new storage policy according to aspects described herein. Method 300 terminates at operation 308.

While method 200 and method 300 in FIGS. 2 and 3, respectively, are described in examples where a single storage object is processed, it will be appreciated that similar techniques may be used to process any number of storage objects, each of which may have similar or different current and/or new storage policies. An example of such processing is provided below with respect to method 400 in FIG. 4.

Figure 4:
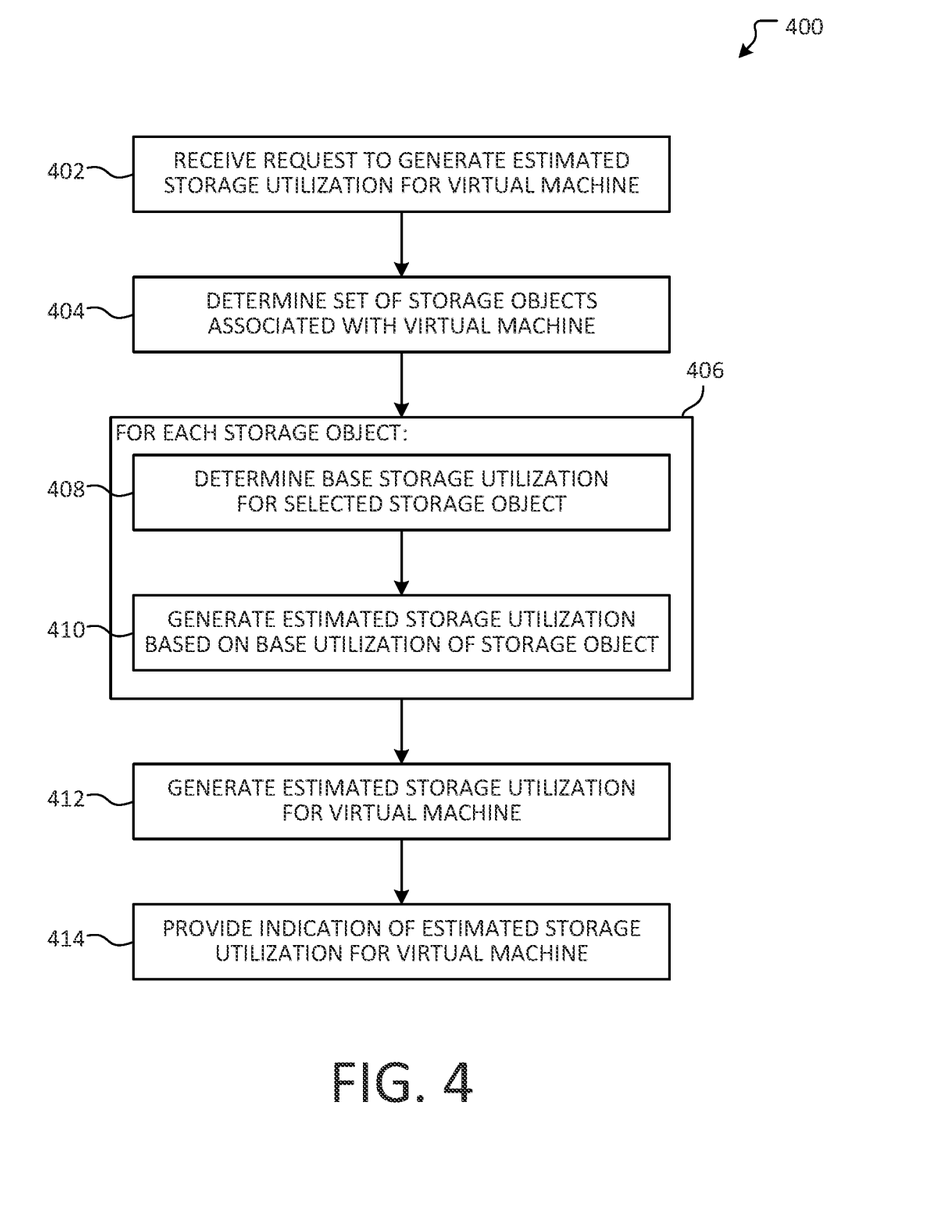
FIG. 4 illustrates an overview of an example method for processing a set of storage objects associated with a virtual machine to generate an estimated storage utilization for the virtual machine based on a new storage policy.

FIG. 4 illustrates an overview of an example method 400 for processing a set of storage objects associated with a virtual machine to generate an estimated storage utilization for the virtual machine based on a new storage policy.

As illustrated, method 400 begins at operation 402, where a request is received to generate an estimated storage utilization for a virtual machine. For example, the request may be received by a request processor from a computing device, such as request processor 108 and computing device 104 discussed above with respect to FIG. 1. The request may comprise an indication of the virtual machine and/or an indication of a new storage policy for which the estimated storage utilization is to be generated.

Accordingly, at operation 404, a set of storage objects associated with the virtual machine is determined. For example, the set of storage objects may be determined based on an association between the virtual machine and each determined storage object. The association may be stored in an object store (e.g., object store 114 of FIG. 1), in a database, or in a file associated with the virtual machine, among other examples. In other examples, the request that was received at operation 402 may include an indication as to a set of storage objects, such that operation 404 may be omitted.

Method 400 is illustrated as comprising grouping 406, in which operations 408 and 410 are performed for each storage object of the set of storage objects that was determined at operation 404. Thus, at operation 408, a base storage utilization is determined for the storage object. Aspects of operation 408 may be similar to those discussed above with respect to method 200 of FIG. 2. Accordingly, at operation 410, an estimated storage utilization is generated based on the base storage utilization that was determined at operation 408. Aspects of operation 410 may be similar to those discussed above with respect to method 300 of FIG. 3. As another example, operation 406 and/or 408 may comprise generating an API call (e.g., to an object store manager, such as object store manager 110 in FIG. 1) to obtain the base storage utilization and the estimated storage utilization, respectively. Grouping 406 may be performed iteratively, in parallel, or any combination thereof for the determined set of storage objects.

Eventually, flow arrives at operation 412, where an estimated storage utilization is generated for the virtual machine with which the set of storage objects is associated. For example, operation 4124 may comprise aggregating the estimated storage utilization for each associated storage object, as was determined as a result of performing operations 408 and 410 for each storage object.

Accordingly, at operation 414, an indication of the estimated storage utilization for the virtual machine is provided. For example, if method 400 is performed in response to receiving an API call to determine an estimated storage utilization of a virtual machine (e.g., as may have been received at operation 402), the estimated storage utilization determined at operation 412 may be provided in response to the API call. As another example, the estimated storage utilization may be provided for display to a user (e.g., by an application, such as application 116 in FIG. 1). In some instances, the display may comprise a difference between a current storage utilization of the virtual machine and the estimated storage utilization that was generated at operation 412. As another example, the estimated storage utilization may be used to perform additional processing, as may be the case when a new storage policy associated with the virtual machine is applied in response to receiving an indication to apply the new storage policy according to aspects described herein. Method 400 terminates at operation 414.

It will be appreciated that aspects of methods 200, 300, and/or 400 may be performed local to a computing device in other examples. For example, the computing device may receive information associated with one or more storage objects and may generate a base storage utilization and/or estimated storage utilization accordingly. Additionally, while method 400 is described as an example where storage objects associated with a virtual machine are processed, it will be appreciated that similar techniques may be used to process one or more storage objects based on an association with any of a variety of other entities.

Figure 5:
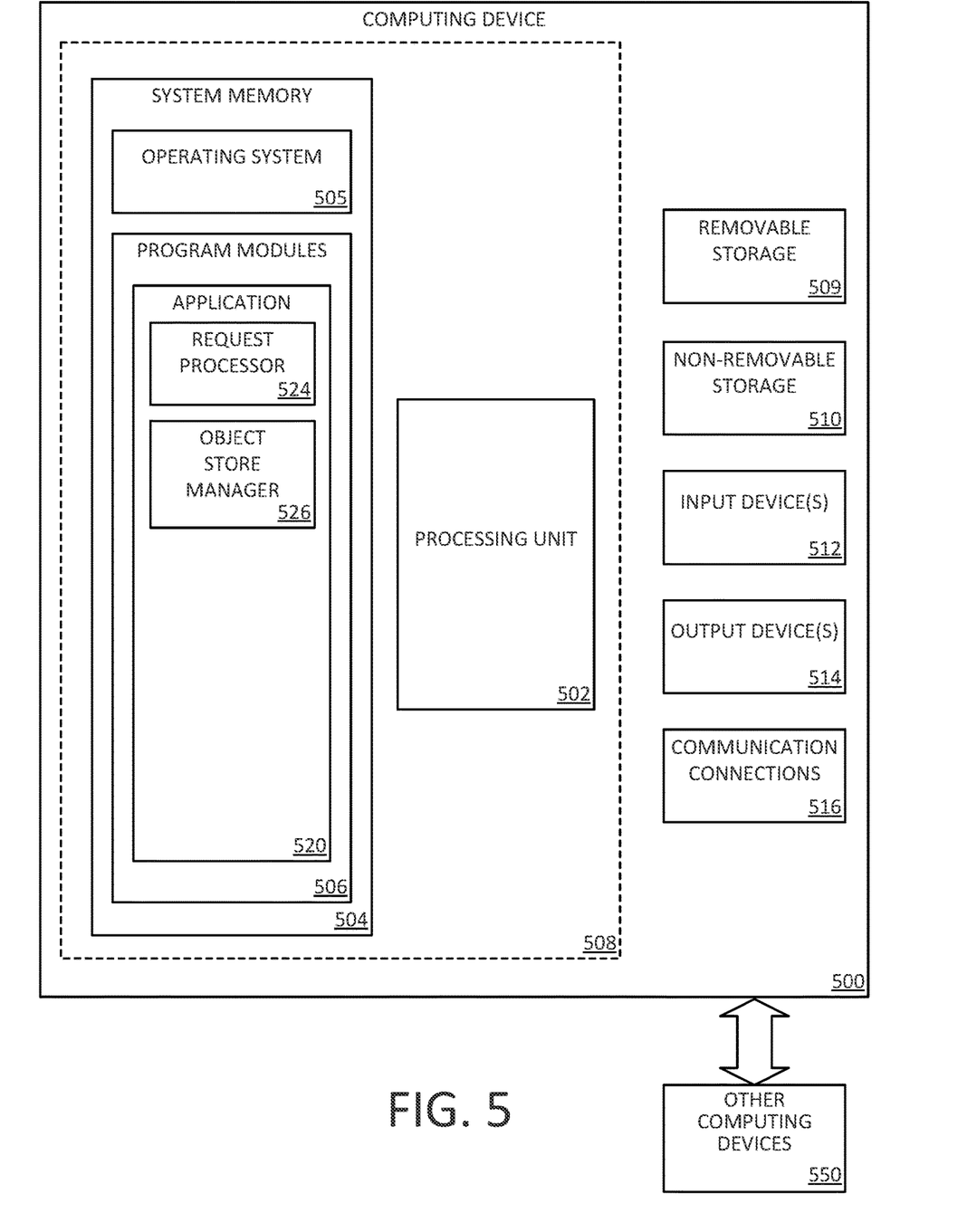
FIG. 5 is a block diagram illustrating example physical components of a computing device with which aspects of the disclosure may be practiced.
Figure 6A:
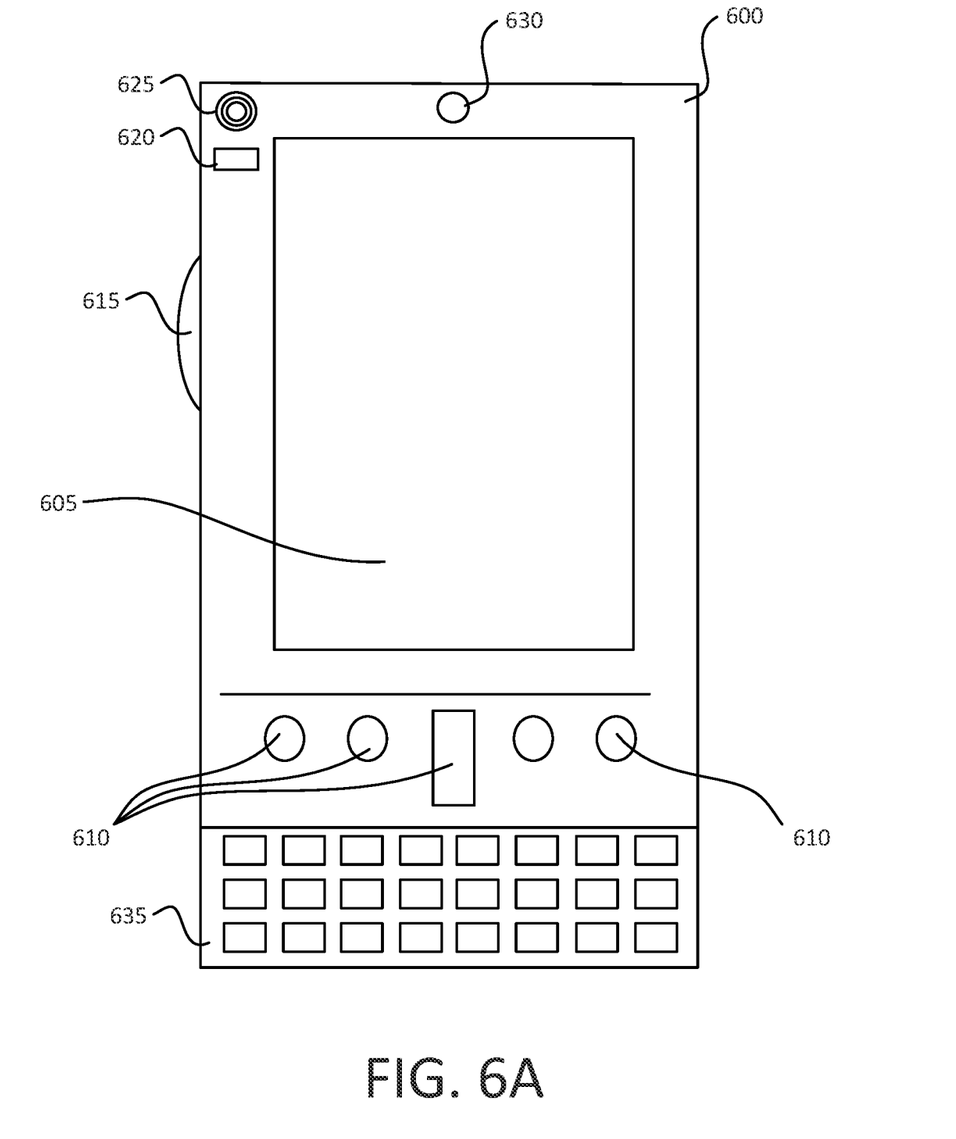
FIGS. 6A and 6B are simplified block diagrams of a mobile computing device with which aspects of the present disclosure may be practiced.
Figure 6B:
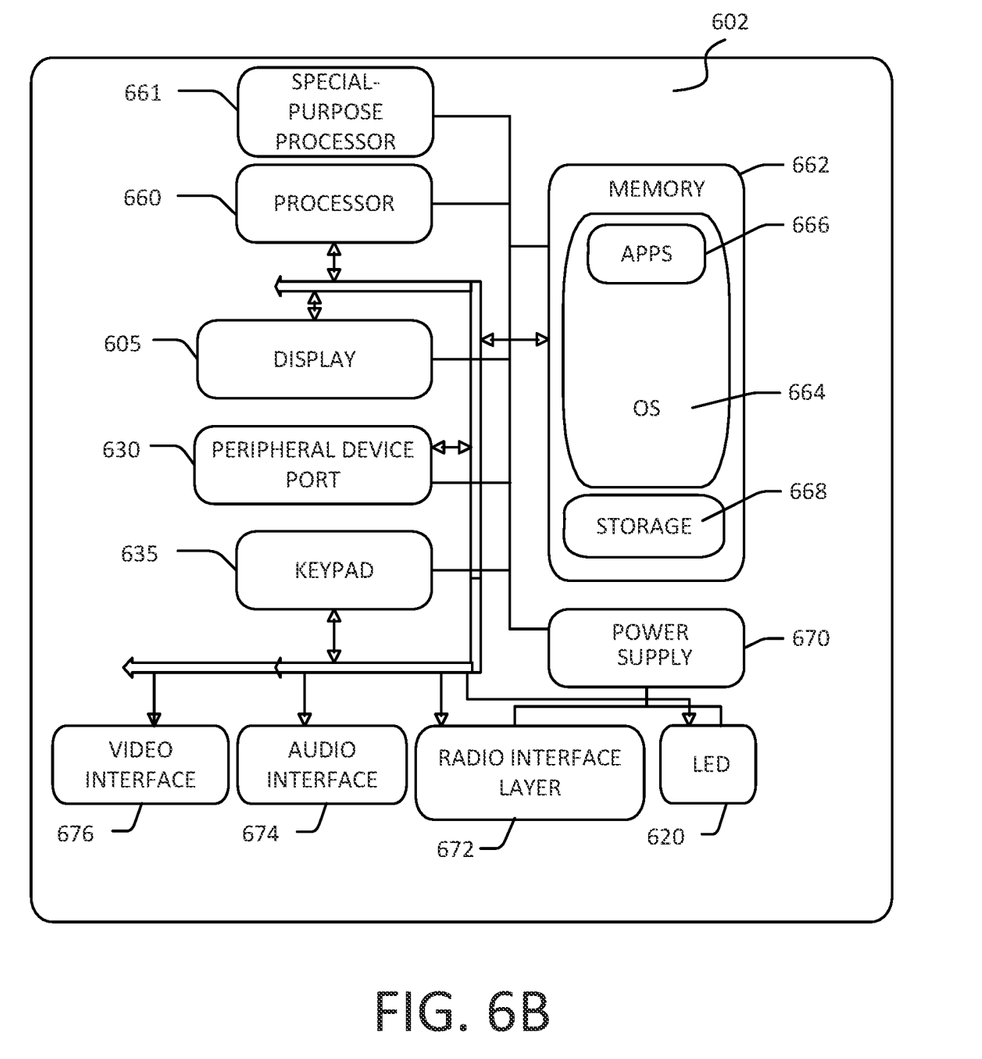
Figure 7:
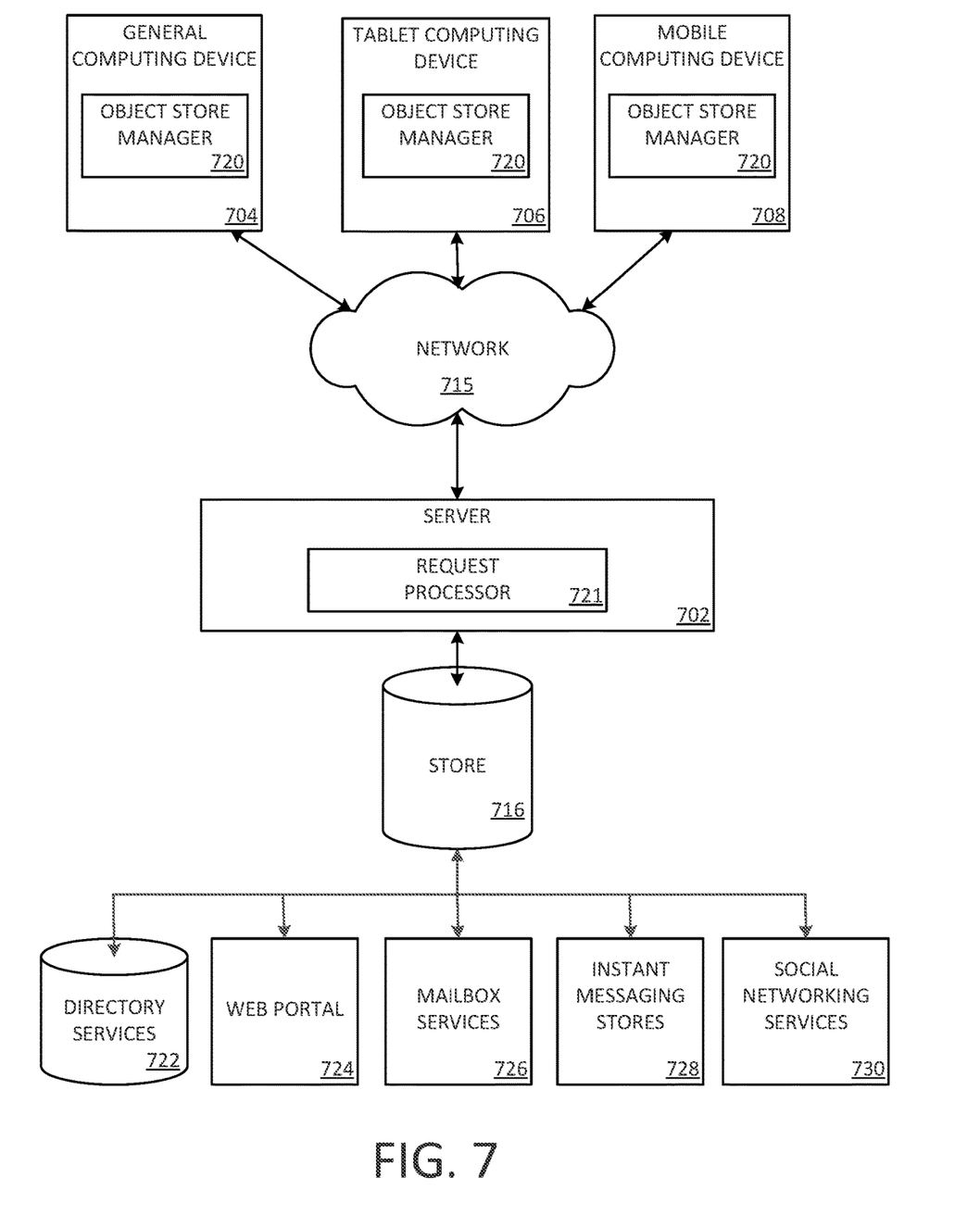
FIG. 7 is a simplified block diagram of a distributed computing system in which aspects of the present disclosure may be practiced.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above, including devices 102 and 104 in FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store request processor 524 and object store manager 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments.

In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display.

In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 according to aspects described herein.

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730.

An object store manager 720 may be employed by a client that communicates with server device 702, and/or request processor 721 may be employed by server device 702. For example, the object store manager 720 may facilitate storage policy changes and provide storage policy change estimations to a user, such that an indication of a changed storage policy may be received and processed by request processor 721 according to aspects described herein. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

It will be appreciated that, as another example, a tablet computing device may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, causes the system to perform a set of operations. The set of operations comprises: receiving a request to generate an estimated storage utilization associated with a storage object, wherein the request includes an indication of a new storage policy; determining, based on an actual storage utilization of the storage object and a current storage policy for the object, a base storage utilization for the storage object; generating, based on the base storage utilization and a storage efficiency of the new storage policy, the estimated storage utilization for the storage object; and providing, in response to the request, an indication of the generated estimated storage utilization. In an example, the request comprises an indication of a virtual environment with which the storage object is associated; and the new storage policy is for the virtual environment. In another example, the actual storage utilization and the current storage policy for the storage object are determined using one or more application programming interface (API) calls to an object store associated with the storage object. In a further example, the set of operations further comprises: receiving a confirmation indication to implement the new storage policy; and providing, to an object store manager, an indication to store the storage object according to the new storage policy. In yet another example, the new storage policy comprises at least one of: a changed RAID ("redundant array of independent disks") level compared to the current storage policy; or a changed fault tolerance level compared to the current storage policy. In a further still example, the current storage policy comprises an indication of a RAID ("redundant array of independent disks") level and a fault tolerance level with which the storage object is stored. In another example, the indication comprises a graphical representation of a difference between the actual storage utilization of the storage object and the estimated storage utilization for the object.

In another aspect, the technology relates to a method for managing storage policies for a storage object. The method comprises: receiving, from a user, a first user input associated with a new storage policy for a storage object; determining, based on the new storage policy, an estimated storage utilization for the storage object; generating a display comprising the estimated storage utilization for the storage object and an indication associated with an actual storage utilization of the storage object; receiving, from the user, a confirmation indication to implement the new storage policy; and in response to the confirmation indication, providing an indication to an object store manager to implement the new storage policy. In an example, the indication associated with the actual storage utilization of the storage object comprises a difference between the estimated storage utilization and the actual storage utilization of the storage object. In another example, the indication associated with the actual storage utilization of the storage object comprises a graphical representation of the difference between the estimated storage utilization and the actual storage utilization of the storage object. In a further example, the storage object is associated with a virtual environment, and the display further comprises an aggregate estimate for the virtual environment. In yet another example, the new storage policy comprises at least one of: a changed RAID ("redundant array of independent disks") level compared to the current storage policy; or a changed fault tolerance level compared to the current storage policy. In a further still example, the estimated storage utilization is determined using an application programming interface (API) calls to an object store associated with the storage object.

In a further aspect, the technology relates to a method for managing an object store comprising one or more storage objects. The method comprises: receiving a request to generate an estimated storage utilization associated with a storage object of the object store, wherein the request includes an indication of a new storage policy; determining, based on an actual storage utilization of the storage object and a current storage policy for the object, a base storage utilization for the storage object; generating, based on the base storage utilization and the new storage policy, the estimated storage utilization for the storage object; and providing, in response to the request, an indication of the generated estimated storage utilization. In an example, the request comprises an indication of a virtual environment with which the storage object is associated; and the new storage policy is for the virtual environment. In another example, the actual storage utilization and the current storage policy for the storage object are determined using one or more application programming interface (API) calls to an object store associated with the storage object. In a further example, the method further comprises: receiving a confirmation indication to implement the new storage policy; and providing, to an object store manager, an indication to store the storage object according to the new storage policy. In yet another example, the new storage policy comprises at least one of: a changed RAID ("redundant array of independent disks") level compared to the current storage policy; or a changed fault tolerance level compared to the current storage policy. In a further still example, the current storage policy comprises an indication of a RAID ("redundant array of independent disks") level and a fault tolerance level with which the storage object is stored. In another example, the indication comprises a graphical representation of a difference between the actual storage utilization of the storage object and the estimated storage utilization for the object.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   memory storing instructions that, when executed by the at least one processor, causes the system to perform a set of operations, the set of operations comprising:
     receiving a request to generate an estimated storage utilization associated with a storage object, wherein the request includes an indication of a new storage policy;
     determining, based on an actual storage utilization of the storage object on a data store comprising a plurality of storage devices and a current storage policy for the storage object, a base storage utilization for the storage object, wherein the actual storage utilization is different from the base storage utilization by at least a storage overhead associated with the current storage policy;
     generating, based on the base storage utilization and a storage efficiency of the new storage policy, the estimated storage utilization for the storage object on the data store comprising the plurality of storage devices; and
     providing, in response to the request, an indication of the generated estimated storage utilization.

2. The system of claim 1, wherein:
   the request comprises an indication of a virtual environment with which a set of storage objects including the storage object is associated;
   the new storage policy is for the virtual environment;
   generating an estimated storage utilization further comprises generating an aggregated estimate for the set of storage objects associated with the virtual environment; and
   the set of storage objects is stored on the data store comprising the plurality of storage devices based on the aggregated estimate.

3. The system of claim 1, wherein the actual storage utilization and the current storage policy for the storage object are determined using one or more application programming interface (API) calls to an object store associated with the storage object.

4. The system of claim 1, wherein the set of operations further comprises:
   receiving a confirmation indication to implement the new storage policy; and
   providing, to an object store manager, an indication to store the storage object according to the new storage policy.

5. The system of claim 1, wherein the new storage policy comprises at least one of:
   a changed RAID ("redundant array of independent disks") level compared to the current storage policy; or
   a changed fault tolerance level compared to the current storage policy.

6. The system of claim 1, wherein the current storage policy comprises an indication of a RAID ("redundant array of independent disks") level and a fault tolerance level with which the storage object is stored.

7. The system of claim 1, wherein the indication comprises a graphical representation of a difference between the actual storage utilization of the storage object and the estimated storage utilization for the object.

8. A method for managing storage policies for a storage object, the method comprising:
   receiving, from a user, a first user input associated with a new storage policy for a storage object;
   determining, based on an actual storage utilization of the storage object on a data store comprising a plurality of storage devices and a current storage policy for the storage object, a base storage utilization for the storage object, wherein the actual storage utilization is different from the base storage utilization by at least a storage overhead associated with the current storage policy;
   determining, based on the base storage utilization and the new storage policy, an estimated storage utilization for the storage object on the data store comprising the plurality of storage devices;
   generating a display comprising the estimated storage utilization for the storage object and an indication associated with an actual storage utilization of the storage object;
   receiving, from the user, a confirmation indication to implement the new storage policy; and
   in response to the confirmation indication, providing an indication to an object store manager to implement the new storage policy.

9. The method of claim 8, wherein the indication associated with the actual storage utilization of the storage object comprises a difference between the estimated storage utilization and the actual storage utilization of the storage object.

10. The method of claim 9, wherein the indication associated with the actual storage utilization of the storage object comprises a graphical representation of the difference between the estimated storage utilization and the actual storage utilization of the storage object.

11. The method of claim 8, wherein the storage object is associated with a virtual environment, and the display further comprises an aggregate estimate for a set of storage objects associated the virtual environment, and the set of storage objects is stored on the data store comprising the plurality of storage devices based on the aggregated estimate.

12. The method of claim 8, wherein the new storage policy comprises at least one of:
   a changed RAID ("redundant array of independent disks") level compared to the current storage policy; or
   a changed fault tolerance level compared to the current storage policy.

13. The method of claim 8, wherein the estimated storage utilization is determined using an application programming interface (API) calls to an object store associated with the storage object.

14. A method for managing an object store comprising one or more storage objects, the method comprising:
- receiving a request to generate an estimated storage utilization associated with a storage object of the object store, wherein the request includes an indication of a new storage policy;
- determining, based on an actual storage utilization of the storage object on a data store comprising a plurality of storage devices and a current storage policy for the storage object, a base storage utilization for the storage object, wherein the actual storage utilization is different from the base storage utilization by at least a storage overhead associated with the current storage policy;
- generating, based on the base storage utilization and the new storage policy, the estimated storage utilization for the storage object on the data store comprising the plurality of storage devices; and
- providing, in response to the request, an indication of the generated estimated storage utilization.

15. The method of claim 14, wherein:
- the request comprises an indication of a virtual environment with which a set of storage objects including the storage object is associated;
- the new storage policy is for the virtual environment;
- generating an estimated storage utilization further comprises generating an aggregated estimate for the set of storage objects associated with the virtual environment; and
- the set of storage objects is stored on the data store comprising the plurality of storage devices based on the aggregated estimate.

16. The method of claim 14, wherein the actual storage utilization and the current storage policy for the storage object are determined using one or more application programming interface (API) calls to an object store associated with the storage object.

17. The method of claim 14, further comprising:
- receiving a confirmation indication to implement the new storage policy; and
- providing, to an object store manager, an indication to store the storage object according to the new storage policy.

18. The method of claim 14, wherein the new storage policy comprises at least one of:
- a changed RAID ("redundant array of independent disks") level compared to the current storage policy; or
- a changed fault tolerance level compared to the current storage policy.

19. The method of claim 14, wherein the current storage policy comprises an indication of a RAID ("redundant array of independent disks") level and a fault tolerance level with which the storage object is stored.

20. The method of claim 14, wherein the indication comprises a graphical representation of a difference between the actual storage utilization of the storage object and the estimated storage utilization for the object.

\* \* \* \* \*